US006487527B1

(12) United States Patent
Soheili

(10) Patent No.: US 6,487,527 B1
(45) Date of Patent: Nov. 26, 2002

(54) ENHANCED QUANTIZATION METHOD FOR SPECTRAL FREQUENCY CODING

(75) Inventor: Rahmin Soheili, San Francisco, CA (US)

(73) Assignee: Seda Solutions Corp., San Francisco, CA (US)

( * ) Notice: Subject to any disclaimer, the term of this patent is extended or adjusted under 35 U.S.C. 154(b) by 0 days.

(21) Appl. No.: 09/566,909

(22) Filed: May 9, 2000

(51) Int. Cl.[7] ................................................ G01L 21/00
(52) U.S. Cl. ........................................ 704/219; 704/230
(58) Field of Search ................................. 704/219, 222, 704/230

(56) References Cited

U.S. PATENT DOCUMENTS 5,704,001 A * 12/1997 Gardner ...................... 704/209
6,044,343 A * 3/2000 Cong et al. ................. 704/222
6,070,136 A * 5/2000 Cong et al. ................. 704/222
6,081,776 A * 6/2000 Grabb et al. ................ 704/219
6,263,307 B1 * 7/2001 Arslan et al. ............... 704/205
6,347,297 B1 * 2/2002 Asghar et al. .............. 704/232

* cited by examiner

*Primary Examiner*—Tālivaldis Ivars Šmits
*Assistant Examiner*—Angela Armstrong
(74) *Attorney, Agent, or Firm*—MacPherson Kwok Chen & Heid LLP; Edward C. Kwok

(57) ABSTRACT

A linear predictive speech encoding method combines vector quantization with the search for roots of LSP polynomials. At Under this method, a code book searchable using line spectral pair (LSP) values is created from a line spectral frequency (LSF) code book, thus ensuring linear distortion performance without the costly run-time complexity of finding roots to high-order LSP polynomials in the LSF domain.

6 Claims, 2 Drawing Sheets

Arranged by increasing $k_3$

| $k_1$ | $k_3$ | Index |
|---|---|---|
| −0.8 | −0.9 | 0 |
| −0.7 | −0.6 | 1 |
| ⋮ | ⋮ | 2 |
| ⋮ | ⋮ | 3 |
| ⋮ | ⋮ | 4 |
| ⋮ | ⋮ | |
| ⋮ | ⋮ | ⋮ |
| | | |
| 0.7 | 0.9 | 64 |

400

ENHANCED QUANTIZATION METHOD FOR SPECTRAL FREQUENCY CODING

BACKGROUND OF THE INVENTION b 1. Field of the Invention

The present invention relates to speech processing. In particular, the present invention relates to an enhanced method for performing speech modeling and vector quantization in speech encoding applications.

2. Discussion of the Related Art

Linear Predictive Coding (LPC) techniques are widely used in speech encoding applications. In the prior art, to efficiently code LPC parameters into as few bits as possible, and to maintain a linear distortion performance over a wide range of values of LPC parameters, LPC parameters are sometimes represented in the frequency domain as line spectral frequencies (LPFs) using, for example, any of the methods disclosed in Chapter 4, entitled "LPC PARAMETER QUANTIZATION USING LSFS", in *Digital Speech Coding for Low Bit Rate Communication Systems* by A. M. Kondoz, published by Wiley & Sons (1994) ("*Digital Speech Coding*"). The principle steps of one such method are illustrated by process 100 of FIG. 1. Under this method, at step 101, a set of coefficients is first estimated using linear prediction represented by a linear predictor model LP(n) of order l given by:

$$LP(n) = \sum_{i=1}^{l} \alpha_i s(n-i)$$

where s(n) is value of the speech signal at time n, $\alpha_i$ is $i^{th}$ LPC coefficient such that the error e(n)=s(n)−LP(n) is minimized. In one instance, l is 10. Typically, in the encoding process, the LPC coefficients are extracted every update period, which can be a time period 20–30 milliseconds long.

Then, at step 102, from the $\alpha_i$'s, two ½-degree polynomials P(x) and Q(x) are constructed. Polynomials P(x) and Q(x) are given by the following:

$$P(x) = \sum_{i=0}^{l/2} a_i x^i$$

$$Q(x) = \sum_{i=0}^{l/2} b_i x^i$$

The coefficients $a_i$ and $b_i$ are each a function of the LPC coefficients $\alpha_i$. The l roots of polynomials P(x) and Q(x) are a set of values $k_i$ ($1 \geqq k_i \geqq -1$), in which the odd indices $k_i$'s (i.e., i=1, 3, 5, . . . ) are roots of polynomial P(x) and the even indices $k_i$'s (i.e., i=2, 4, 6. . . ) are roots of polynomial Q(x), and ordered such that $k_i > k_{i+1}$. and are typically grouped into ½ "line spectral pairs" (LSPs), each LSP consisting of a pair ($k_i$, $k_{i+1}$). FIG. 3 shows an example of a 5$^{th}$ order polynomial P (x) having roots $k_1$, $k_3$, $k_5$, $k_7$ and $k_9$.

LSPs are, however, non-linear parameters, which are not suitable for efficient quantization. In particular, if linear quantization steps are used, requisite resolution may not attained over some range of values, and wasteful for unnecessary resolution over some other range of values. Thus, at step 103, the LSPs are transformed into the frequency domain by taking the arc-cosine (i.e., $\cos^{-1} k_i$) of each root $k_i$. The resulting values of the transformation are referred to as "line spectral frequencies" ("LSFs").

At step 104, the LSFs are then quantized. In one instance, the LSFs are "vector quantized" by using the LSF values to search a "code book" for an index which represents the set of quantized LSF values. For example, the 2-vector ($\cos^{-1} k_1$, $\cos^{-1} k_3$) can be used to search a 2-dimensional table in the code book. If 6 bits are allocated to represent such a pair, the 2-dimensional table has 64 entry corresponding to 64 pairs of selected possible values for ($\cos^{-1} k_1$, $\cos^{-1} k_3$). In one implementation, the index of the entry ($x_i$, $x_j$) for which the mean squared error $(x_i - \cos^{-1} k_1)^2 + (x_j - \cos^{-1} k_3)^2$ is minimum is selected to represent the 2-vector ($\cos^{-1}k_1$, $\cos^{-1} k_3$). Higher dimensional tables are possible for vector quantizing a larger number of LSF values. For example, at three bits per root, a 3-dimensional table searchable by a 3-vector ($\cos^{-1} k_1$, $\cos^{-1} k_3$, $\cos^{-1} k_5$) has 9-bit indices, or 512 entries. Of course, for the same per-root bit allocation (e.g., 3 bits per root), the storage requirements grow exponentially with the number of dimensions. In communication or storage applications, for example, the indices are transmitted or saved. At a later time, speech is synthesized or reconstructed (e.g., at the receiver side, or when replaying from storage) using a process that is substantially the reverse of process 100 discussed above.

In the method described above, finding the l roots of polynomials P(x) and Q(x) at step 102 is typically performed using numerical methods (e.g., Newton's method) which can be computationally intensive. In one method, each root $k_i$ is found by evaluating P(k) or Q(k) for the trial values k between −1 and 1, at increments of 0.0005. Such a method requires substantial amount computation which is undesirable in real-time applications.

SUMMARY OF THE INVENTION

The present invention provides a linear predictive speech encoding method which combines the quantization step with the search of roots of line spectral pair (LSP) polynomials. In one embodiment, according to one embodiment of the present invention, an indexed table having as entries quantized line spectral pair (LSP) values is created from a table of quantized line spectral frequencies (LSFs). Under a method of the present invention, during each update period, a set of LPC coefficients is computed to derive LSP polynomials P(x) and Q(x). However, instead of finding the roots of the polynomials P(x) and Q(x), polynomials P(x) and Q(x) are evaluated using the quantized LSP values of the indexed table. The approximate roots of the polynomials P(x) and Q(x) are selected from the entry of the indexed table whose quantized LSP values give the least error when used to evaluate polynomials P(x) and Q(x). The index of the selected entry of the table can be used to representing the approximate roots in the speech encoding application.

In one embodiment, the method selects the approximate roots by selecting such quantized LSP values that provide a least mean squared error in evaluating polynomials P(x) and Q(x). Further, under one method of the present invention, a step is taken to ensure that each selected LSP value corresponds to a designated root of the polynomials P(x) and Q(x). In one instance, the ensuring step is achieved by examining the direction of change in value of polynomial P(x) when successively decreasing LSP values for x are substituted into polynomial P(x). In one implementation, each of said polynomials P(x) and Q(x) is 5$^{th}$-order.

According to another aspect of the present invention, a code book used in conjunction with the present invention can be organized as a number of multi-dimensional tables each representing vectors of quantized LSP values corresponding to multiple roots of the LSP polynomials. In one embodiment, the entries of each table of LSP values are arranged in a decreasing order of proposed LSP values in a designated root of the LSP polynomials.

Under the present invention, during run time, complex operations for searching the roots of the polynomials are avoided. Further, because the code book is prepared from an LSF code book, the desirable linear distortion performance of quantization in the LSF domain is preserved.

The present invention is better understood upon consideration of the detailed description below and the accompanying drawings.

DETAILED DESCRIPTION OF THE PREFERRED EMBODIMENTS

The present invention provides a method which combines quantization with searching of roots for the line spectral pair (LSP) polynomials.

Figure 1:
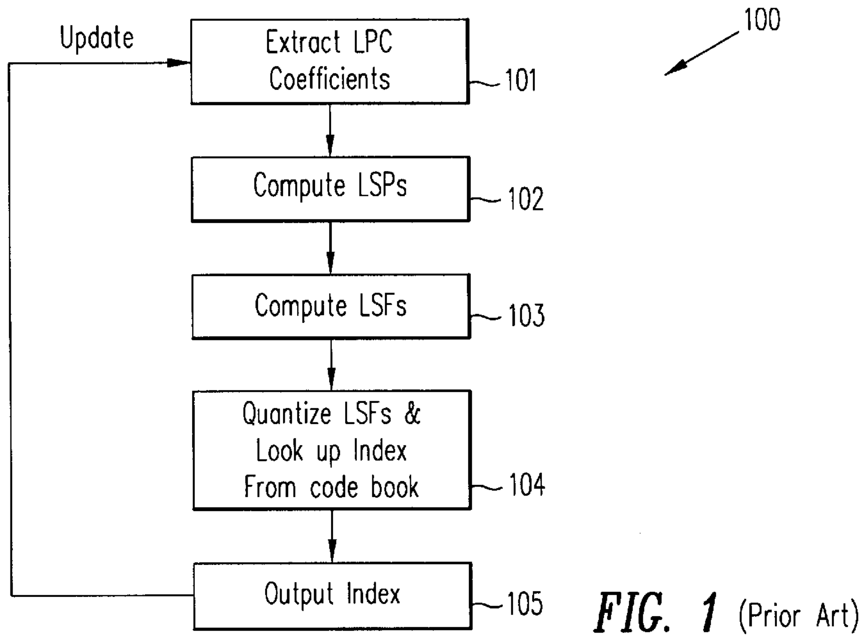
FIG. 1 (Prior Art)
FIG. 1 shows process 100 illustrating the procedures for vector quantization of line spectral frequencies (LSFs) in the prior art.
Figure 2:
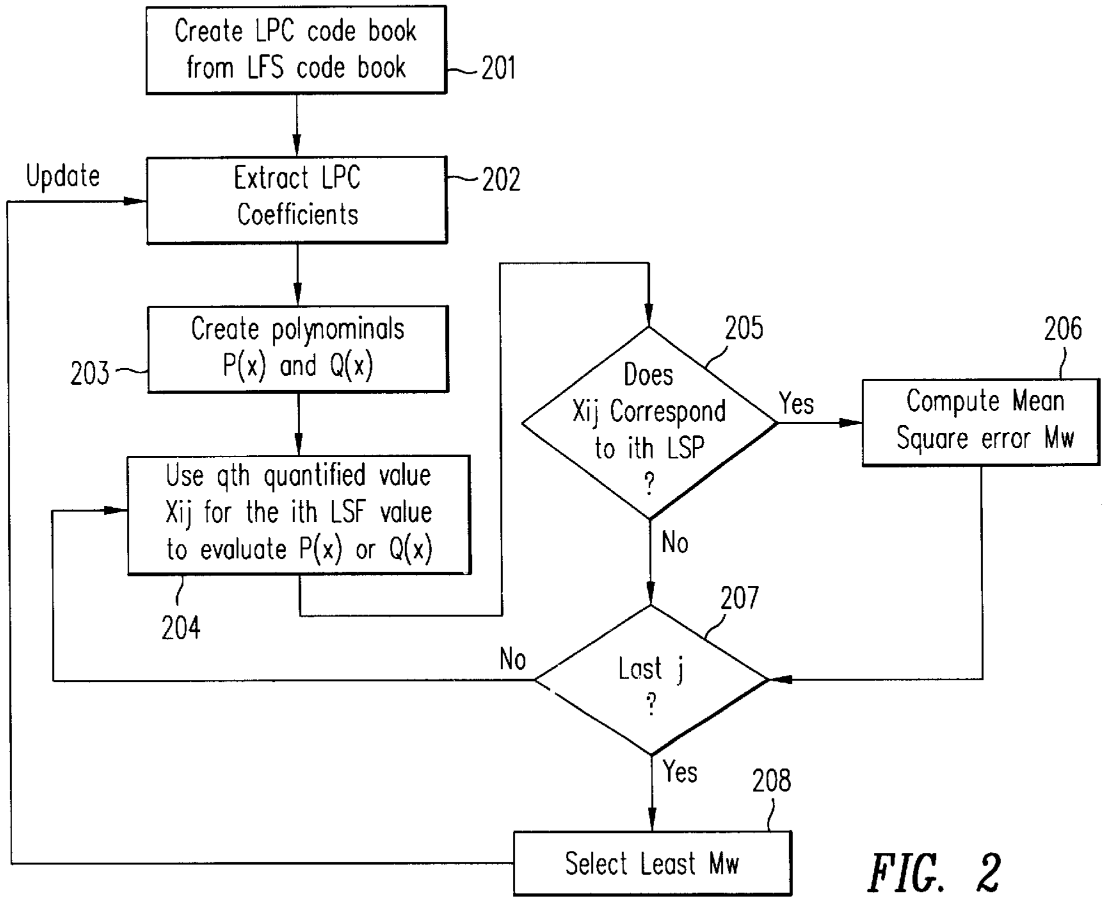
FIG. 2 shows process 200 illustrating the procedures for vector quantization of linear predictive coding (LPC) coefficients with LSF linear performance, in accordance with one embodiment of the present invention.
Figures 3, 4:
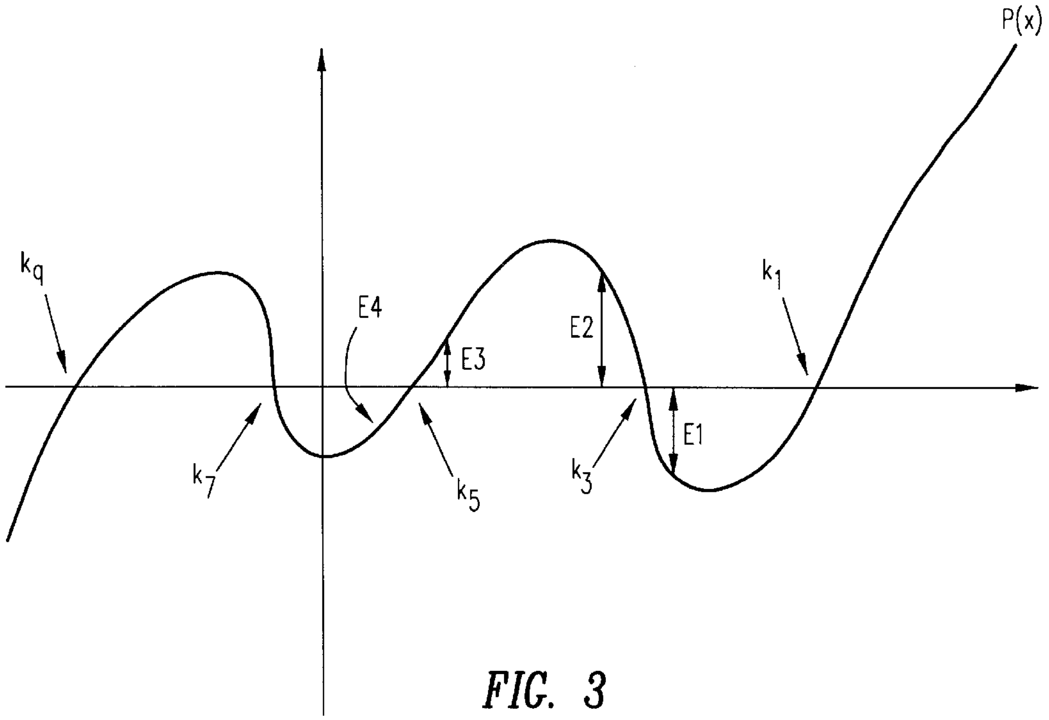
FIG. 3 shows an example of a $5^{th}$ order polynomial P(x) having roots $k_1$, $k_3$, $k_5$, $k_7$ and $k_9$.
FIG. 4 is an example of a 2-dimensional quantization table searchable by roots $k_1$ and $k_3$.

In accordance with one embodiment of the present invention, a method for speech encoding is illustrated by process 200 of FIG. 2. At step 201, a new code book ("LSP code book") is created from a conventional LSF code book. In this LSP code book, unlike the conventional LSF code book which is searched by LSF vectors, the LSP code book is searchable by the LSP vectors (i.e., by vectors of $k_i$'s, rather than vectors of $\cos^{-1} k_i$'s). Since the LSP code book is created from an LSF code book, the characteristics of linear quantization in a LSF code book is preserved. As in the LSF code book, the LSP code book can also be organized as a set of multi-dimensional tables. Preferably, as explained in further detail below, the entries of each multi-dimensional table is arranged in increasing or decreasing value of one of the roots to facilitate searching under the present invention. FIG. 4 is an example of a 2-dimensional quantization table 400 in which the $j^{th}$ entry is given by a 2-vector $(x_{1j}, x_{3j})$, where $x_{1j}$ and $X_{3j}$ are candidate values for the first and second roots $k_1$ and $k_3$ of polynomial P(x). In particular, table 400 is arranged to allow the 2-vectors to be accessed sequentially in decreasing order of $X_{3j}$.

During run time, at every update period (i.e., step 202), the LPC coefficients (i.e., the $\alpha_i$'s) are extracted from the speech signal in substantially the same manner as step 101 of the prior art. At step 203, the extracted $\alpha_i$'s are then used to create LSP polynomials P(x) and Q(x) in a conventional manner. However, under the present invention, rather than using numerical methods to search for the roots of polynomials P(x) and Q(x), the quantized values in each multi-dimensional table are each substituted into the corresponding polynomial P(x) or Q(x) (step 204). To illustrate step 204, using table 400 as an example, the 2-vector $(x_{1j}, x_{3j})$ in the $j^{th}$ entry of table 400 is used to evaluate $P(x_{1j})$ and $P(x_{3j})$ for every value of j. If both the $x_{1j}$ and $X_{3j}$ values of the 2-vector $(x_{1j}, x_{3j})$ are roots of polynomial P(x), both $P(x_{1j})$ and $P(x_{3j})$ would evaluate to zero. Thus, the $j^{th}$ 2-vector $(x_{1j}, x_{3j})$ for which the mean squared value $M=P(x_{1j})^2+P(X_{3j})^2$ is minimum is a likely candidate for roots $k_1$ and $k_3$. However, even though $P(x_{1j})$ and $P(x_{3j})$ both evaluate to zero, one must ascertain that $x_{1j}$ and $X_{3j}$ correspond to roots $k_1$ and $k_3$, respectively, and not, for example, to roots $k_1$ and $k_5$. To that end, if one examines FIG. 3, for example, one observes that, as one approaches root $k_3$ from the right, i.e., using successively lesser test values x, the values of P(x) go from negative ($E_1$) to positive ($E_2$). On the other hand, as one approaches root $k_5$ from the right, i.e., using successively lesser test values x, the values of P(x) go from positive ($E_3$) to negative ($E_4$). Thus, in one embodiment of the present invention, at step 205, candidate values $x_{1j}$ and $x_{3j}$ are considered only if they correspond to roots $k_1$ and $k_3$, respectively, using the direction of change of $P(x_{3j})$. At step 206, for each vector $(x_{1j}, x_{3j})$ for which $P(x_{3j})$ is increasing as the test value $x_{3j}$ decreases, a weighted mean squared value $M_w=w_2*P(x_{1j})^2+w_2*P(X_{3j})^2$ is computed, where $w_1$ and $w_2$ are empirically determined weights accorded to each LSP. Weights $w_1$ and $w_2$ can have different values according to the application when there is a need to place emphasize on an LSP value over another. At step 207, the values $x_{1j}$ and $x_{3j}$ of the 2-vector $(x_{1j}, x_{3j})$ that provides the least mean square value $M_w$ are selected as the computed roots $k_1$ and $k_3$, respectively.

The above detailed description is provided to illustrate As the specific embodiments of the present invention and is not intended to be limiting. Numerous variations and modifications within the scope of the present invention are possible. The present invention is set forth in the following claims.

I claim:

1. A method for speech encoding, comprising:

creating, from a table of quantized line spectral frequency values, an indexed table having as entries quantized line spectral pair (LSP) values; and during each update period, (a) extracting from a frame of speech signal a set of LPC coefficients; (b) deriving from said set of LPC coefficients LSP polynomials P(x) and Q(x), (c) evaluating said polynomials P(x) and Q(x) using said quantized LSP values, and (d) selecting from said quantized LSP values approximate roots of said polynomials ERE P(x) and Q(x); and representing said approximate roots by the index of the entry of said table corresponding to said approximate roots.

2. A method as in claim 1, wherein said selecting selects said approximate roots by selecting such quantized LSP values that provide a least mean-square error value.

3. A method as in claim 2, further comprising ensuring that each selected LSP value corresponds to a designated root of said polynomials.

4. A method as in claim 3, wherein said ensuring is achieved by examining the direction of change in value of polynomial P(x) when successively decreasing LSP values for x are substituted into polynomial P(x).

5. A method as in claim 1, wherein each of said polynomials P(x) and Q(x) is $5^{th}$-order.

6. A method as in claim 1, wherein said table of LSP values is multi-dimensional and arranged in a decreasing order of a designated LSP value.

* * * * *